(12) United States Patent
Voorwinden et al.

(10) Patent No.: US 8,341,443 B2
(45) Date of Patent: Dec. 25, 2012

(54) SYSTEM AND METHOD FOR SECURE REAL TIME CLOCKS

(75) Inventors: Cor Voorwinden, Toulouse (FR); Michael Priel, Hertzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 429 days.

(21) Appl. No.: 12/599,126

(22) PCT Filed: May 11, 2007

(86) PCT No.: PCT/IB2007/052713
§ 371 (c)(1),
(2), (4) Date: Nov. 6, 2009

(87) PCT Pub. No.: WO2008/139275
PCT Pub. Date: Nov. 20, 2008

(65) Prior Publication Data
US 2010/0301907 A1    Dec. 2, 2010

(51) Int. Cl.
*G06F 1/00* (2006.01)
(52) U.S. Cl. ........ 713/322; 713/300; 713/320; 713/500; 713/501; 713/502
(58) Field of Classification Search .................. 713/300, 713/320, 322, 500, 501, 502
See application file for complete search history.

(56) References Cited

U.S. PATENT DOCUMENTS

| | | | | |
|---|---|---|---|---|
| 5,748,570 A * | 5/1998 | Komoda | ..................... | 368/202 |
| 5,943,613 A * | 8/1999 | Wendelrup et al. | ......... | 455/343.1 |
| 6,304,517 B1 * | 10/2001 | Ledfelt et al. | ................... | 368/10 |
| 6,725,067 B1 * | 4/2004 | Marx et al. | ..................... | 455/574 |
| 7,421,251 B2 * | 9/2008 | Westwick et al. | ............... | 455/85 |
| 7,500,125 B2 * | 3/2009 | Yasumoto | ...................... | 713/322 |
| 7,561,541 B2 * | 7/2009 | Ferchland et al. | ............ | 370/311 |
| 7,668,891 B2 * | 2/2010 | Guilford | ........................ | 708/200 |
| 7,854,544 B2 * | 12/2010 | Cheng et al. | ................... | 368/200 |
| 2002/0038433 A1 * | 3/2002 | Dalrymple et al. | ........... | 713/322 |
| 2005/0007205 A1 * | 1/2005 | Bridger | ...................... | 331/108 C |
| 2006/0164177 A1 * | 7/2006 | Shirotori | ......................... | 331/74 |
| 2006/0168461 A1 | 7/2006 | Allen | | |

FOREIGN PATENT DOCUMENTS

| | | |
|---|---|---|
| EP | 0726508 A | 8/1996 |
| WO | 2004/012067 A | 2/2004 |

OTHER PUBLICATIONS

International Search Report and Written Opinion correlating to PCT/IB2007/052713 dated Feb. 14, 2008.

* cited by examiner

*Primary Examiner* — Jaweed A Abbaszadeh

(57) ABSTRACT

A secure real time clock (RTC) system is provided, comprising a secure RTC, a frequency signal generator, and a frequency adjuster connected between the secure RTC and the frequency signal generator to receive a signal having a first frequency from the frequency signal generator. On receipt of a first control signal the frequency adjuster outputs the signal having the first frequency to the secure RTC, and on receipt of a second control signal the frequency adjuster adjusts the signal having the first frequency to generate a signal having a second frequency, the second frequency being lower than the first frequency, and outputs the signal having the second frequency to the secure RTC. A clock line transmits the signal having the first frequency and the signal having the second frequency from the frequency adjuster to the secure RTC, and has a first power consumption when transmitting the signal having the first frequency and a second power consumption when transmitting the signal having the second frequency, the first power consumption being greater than the second power consumption.

20 Claims, 4 Drawing Sheets

SYSTEM AND METHOD FOR SECURE REAL TIME CLOCKS

FIELD OF THE INVENTION

This invention relates to a system and method for secure real time clocks, particularly, but not exclusively, for use in portable electronic devices.

BACKGROUND OF THE INVENTION

In electronic devices, portable and otherwise, it is standard to provide a real time clock (RTC). This is an electronic unit which keeps track of the date and time of day, which information is available for the other components of the device. Virtually all RTCs use a crystal oscillator, the frequency of which is usually 32.768 kHz. In current electronic devices, RTCs and associated components are situated in a power management integrated circuit (PMIC) of the device.

To function correctly, i.e. to maintain an accurate track of the date and time, the RTCs and associated components must be continuously powered. When the electronic device in which an RTC is situated is powered (e.g. from an external power source or a battery), the RTC and associated components use this power source. When the electronic device is not powered, the RTC and associated components must be provided with an auxiliary power source. This may be provided, for example, by a coincell battery, embedded in the device. Such an auxiliary power source would be expected to provide power during long periods and in some cases for the lifetime of the electronic device. When the RTC and associated components are powered from such an auxiliary power source, it is therefore particularly important that the RTC etc. have low power consumption, to avoid depleting the auxiliary source too quickly. The power consumption of the RTC and associated components should be in the region of 5 µA or less. Such power consumption levels are usually achievable when the RTC and associated components are situated in the PMIC of the device.

In next generation electronic devices, it is proposed to provide 'secure' RTCs. This is to be achieved by implementing the RTC on the microprocessor of the electronic device. This provides greater security for the RTC, and allows provision of additional security features of the RTC. For this partitioning, the associated component of the RTC comprising the oscillator will remain in the PMIC, and a clock line will be required to connect the oscillator and the RTC. The clock line must continuously supply a signal to the RTC, for this to maintain an accurate track of date and time. It is proposed that the clock line signal has a frequency of that of the oscillator, i.e. 32.768 kHz. When this is the case, the clock line will have a power consumption of approximately 2.5 µA. When the RTC, oscillator and clock line are powered from the auxiliary power source, the clock line will use approximately 50% of the desired power consumption of the RTC and associated components. This is obviously not ideal.

SUMMARY OF THE INVENTION

The present invention provides a secure real time clock system as described in the accompanying claims. The present invention further provides a method of reducing power consumption of a secure real time clock system as described in the accompanying claims.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
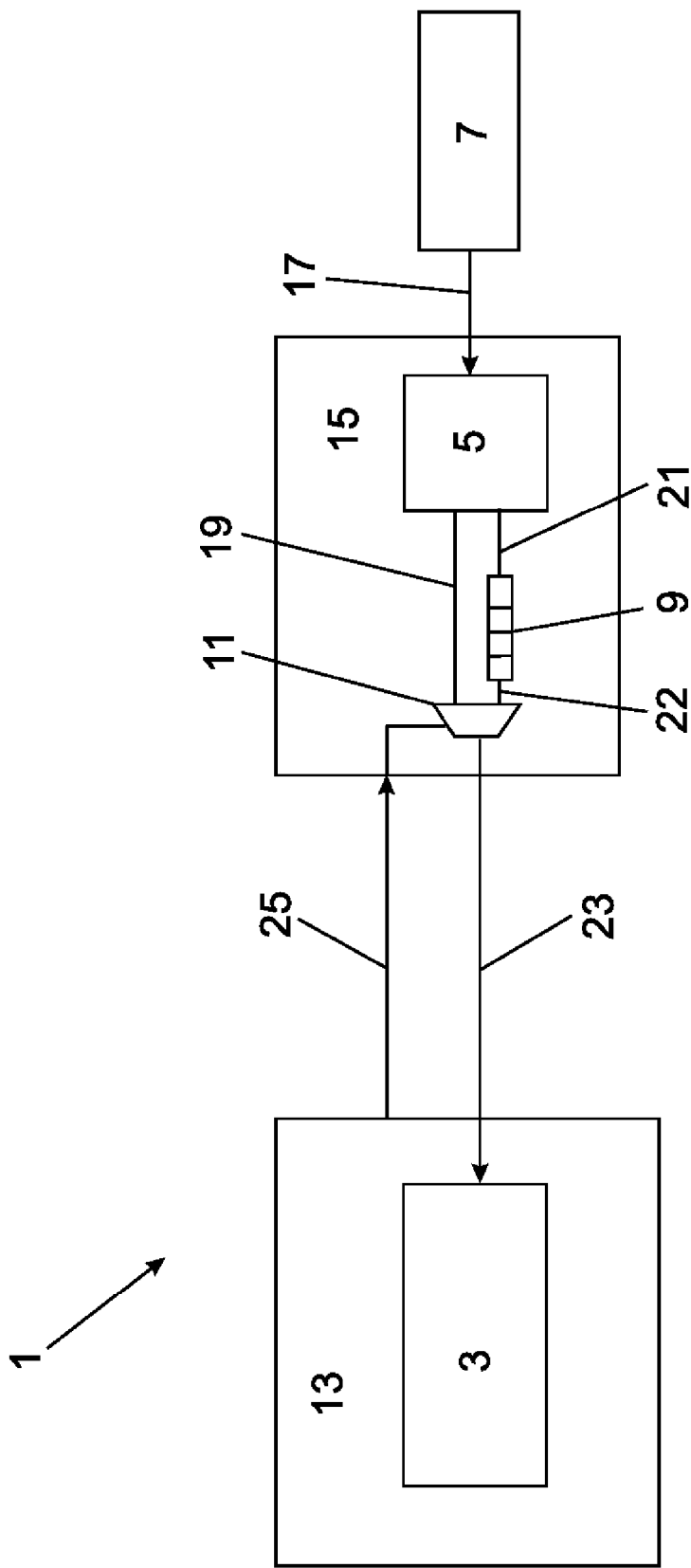
FIG. 1 is a schematic representation of a secure real time clock system in accordance with one embodiment of the invention, given by way of example.

Referring to FIG. 1, a first embodiment of a secure real time clock (RTC) system 1 comprises a secure RTC 3, and associated components comprising an oscillator 5, an oscillator crystal 7, a frequency divider 9, and a multiplexer 11. In use, the RTC and associated components are provided in an electronic device. The RTC 3 is implemented in a microprocessor 13 of the device, and the oscillator 5, frequency divider 9 and multiplexer 11 are implemented in a PMIC 15 of the device. Thus the RTC is a secure RTC.

The oscillator crystal 7 provides an output line 17, which is connected to the oscillator 5. The oscillator 5 is provided with two output lines 19, 21, output line 19 being directly connected to the multiplexer 11, and output line 21 being connected to the frequency divider 9. The frequency divider 9 is provided with an output line 22, which is connected to the multiplexer 11. The multiplexer 11 provides an output line in the form of a clock line 23, which is connected to the secure RTC 3 on the microprocessor 13. The microprocessor 13 provides an output line 25, which is connected to the multiplexer 11.

The device and the system 1 are designed to operate in one of two power modes, a 'normal' power mode and a 'low' power mode.

In the normal power mode, the device and the components of the system 1 are powered by a power source external to the device or a battery of the device. In this mode, the secure RTC 3 is required to operate to 32.768 kHz accuracy and is required to be able to provide timeticks (time mark outputs) if these are required by the microprocessor 13. The oscillator crystal 7 generates a frequency signal of 32.768 kHz, and this is sent to the oscillator 5 via the output line 17. The oscillator 5 outputs the frequency signal to the multiplexer 11 via the output lines 19 and 21. The microprocessor 13 monitors the power mode of the device, and generates a power mode control signal indicating that the normal power mode is operational. This normal power mode control signal is output via the output line 25 to the multiplexer 11. On receipt of the control signal, the multiplexer 11 acts to output a 'full' frequency signal, i.e. the frequency signal on line 19 having a frequency of 32.768 kHz, to the secure RTC 3 via the clock line 23. When transmitting such a full frequency signal, the clock line 23 will have a power consumption of approximately 2.5 µA. However, as the components of the system 1, including the clock line 23, are being powered by an external power source or a battery of the device, and the power consumption of the components of the system 1 are small in comparison to the power consumption of the device as a whole, the power consumption of the clock line 23 is not an issue.

In the 'low' power mode, the device is not powered and the components of the system 1 are powered by an auxiliary power source. This may comprise, for example, a coincell battery embedded in the device. In this mode, the secure RTC 3 is still required to operate to 32.768 kHz accuracy (which accuracy is maintained by the PMIC), but the ability to provide timeticks is not required. The oscillator crystal 7 generates a frequency signal of 32.768 kHz, and this is sent to the oscillator 5 via the output line 17. The oscillator 5 outputs the frequency signal to the multiplexer 11 via the output lines 19 and 21. The microprocessor 13 again monitors the power mode of the device, and generates a power mode control signal indicating that the low power mode is operational. This low power mode control signal is output via the output line 25 to the multiplexer 11. On receipt of the control signal, the multiplexer 11 acts to output a 'reduced' frequency signal, i.e. the frequency signal on line 22, to the secure RTC 3 via the clock line 23. This reduced frequency signal is generated by the frequency divider 9. The frequency divider 9 receives a full frequency signal, i.e. having a frequency of 32.768 kHz, from the oscillator 5, and divides the frequency of this signal by $2^n$. For example, the frequency divider 9 may divide the frequency of the full frequency signal by $2^5$ (i.e. 32), which results in a reduce frequency signal having a frequency of 1.024 kHz. The reduced frequency signal is output to the secure RTC 3 via the clock line 23. When transmitting such a reduced frequency signal, the clock line 23 will have a power consumption which is reduced (by a factor of $2^n$) in comparison to that when a full frequency signal is being transmitted. For example, when the frequency divider 9 provides a reduced frequency signal generated by dividing the full frequency signal by $2^5$, the power consumption of the clock line 23 is reduced from approximately 2.5 µA to approximately 80 nA. When the device and system 1 are operating in the low power mode, the desired power consumption budget is of the order of 5 µA. In the example above, the clock line 23 will have a power consumption of approximately 1.5% of the desired power consumption budget, in comparison to an initial power consumption of approximately 50% of the desired power consumption budget. In this way, the secure real time clock system 1 overcomes the issue of clock line power consumption when the device and system are operating in the low power mode. The accuracy of the RTC which is achieved when it receives a signal having a frequency of 32.768 kHz is maintained even when the RTC receives a signal having a lower frequency, e.g. 1.024 kHz.

The secure RTC system 1 is particularly intended for use in next generation portable electronic devices, such as laptop computers, PDAs, and multimedia players, etc. The invention provides a secure RTC system and method, which dynamically adjusts the frequency of the signal supplied to the secure RTC 3 via the clock line 23, according to the power mode operated by the system. This allows reduction of the power consumption of the system, without losing the original RTC (32.768 kHz) accuracy. Thus a low power secure RTC system is provided.

When the device and secure RTC system 1 are operating in the low power mode, the frequency of the signal supplied to the secure RTC 3 via the clock line 23 will be reduced. This results in the secure RTC 3 operating at a reduced frequency (e.g. 32.768 kHz/$2^n$). This reduced operating frequency of the secure RTC 3 is compensated for by the microprocessor 13, and does not affect the timekeeping ability of the secure RTC.

Operation of the secure RTC system 1 and particularly switching between the full frequency signal and the reduced frequency signal, according to the power mode being operated by the device and system 1, will now be described in more detail.

Figure 2:
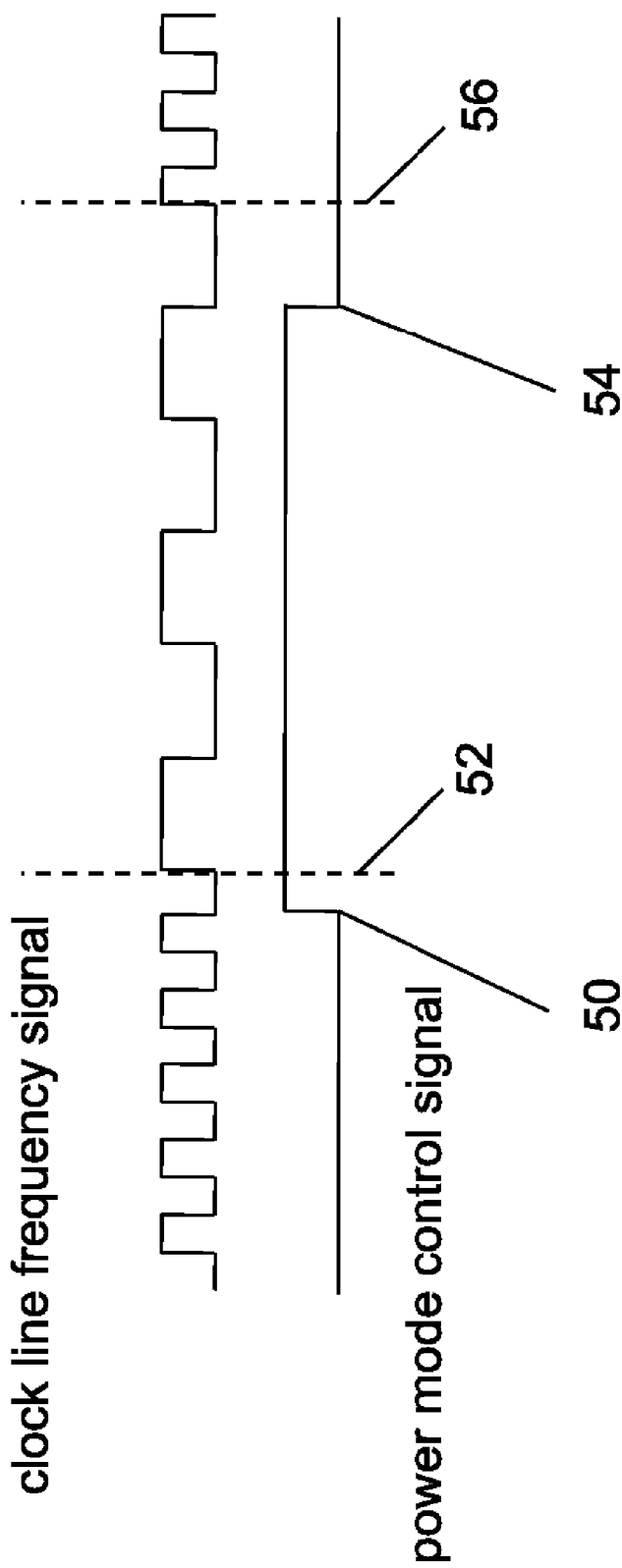
FIG. 2 is a schematic representation of a first operational mode of the system of FIG. 1, given by way of example.

Referring to FIG. 2, a first operational mode of the system 1 will be described. The figure shows a schematic representation of a frequency signal provided to the secure RTC 3 on the clock line 23, and a schematic representation of a power mode control signal provided to the multiplexer 11 on the control line 25. The microprocessor 13 continuously determines the power mode in which the device and system 1 are operating, and generates a power mode control signal of appropriate state. In this operational mode of the system 1, a power mode control signal having a state of 0 is generated by the microprocessor 13 when the system 1 and device are operating in the normal power mode, and a power mode control signal having a state of 1 is generated by the microprocessor 13 when the system 1 and device are operating in the low power mode. It will be appreciated however, that control signals of opposite states could be generated for the normal and low power modes. When the device and system 1 are operating in the normal power mode, i.e. the multiplexer 11 receives a power control signal having a state of 0, the multiplexer 11 acts to output a frequency signal to the clock line 23 which has the 'full' frequency, i.e. in this example of the invention, 32.768 kHz. The secure RTC 3 will operate at this frequency. When the microprocessor 13 detects a change in the device and system operating power mode, from the normal power mode to the low power mode, the microprocessor 13 generates a power control signal of state 1 on the falling edge of a pulse of the frequency signal of the clock line 23 (illustrated at reference 50 of FIG. 2). The change in power control signal state is achieved by pulling a low power pin high. The power control signal of state 1 is received by the multiplexer 11, and at the end of a complete 32.768 kHz cycle of the clock line signal (illustrated at reference 52), the multiplexer 11 acts to output a frequency signal to the clock line 23 which has a 'reduced' frequency, i.e. in this example of the invention, 32.768 kHz divided by $2^n$, where n may be, for example, 5. The secure RTC 3 will change to operate at this frequency, and the microprocessor 13 will compensate for the reduced frequency operation of the secure RTC. When the microprocessor 13 detects a change in the device and system operating power mode, from the low power mode to the normal power mode, the microprocessor 13 generates a power control signal of state 0 on the falling edge of a pulse of the reduced frequency signal of the clock line 23 (illustrated at reference 54 of FIG. 2). The change in power control signal state is achieved by pulling the low power pin low. The power control signal of state 0 is received by the multiplexer 11, and at the end of a complete reduced frequency cycle of the clock line signal (illustrated at reference 56), the multiplexer 11 acts to output a frequency signal to the clock line 23 which has the full frequency, i.e. 32.768 kHz. The secure RTC 3 will change back to operation at this frequency.

Figure 3:
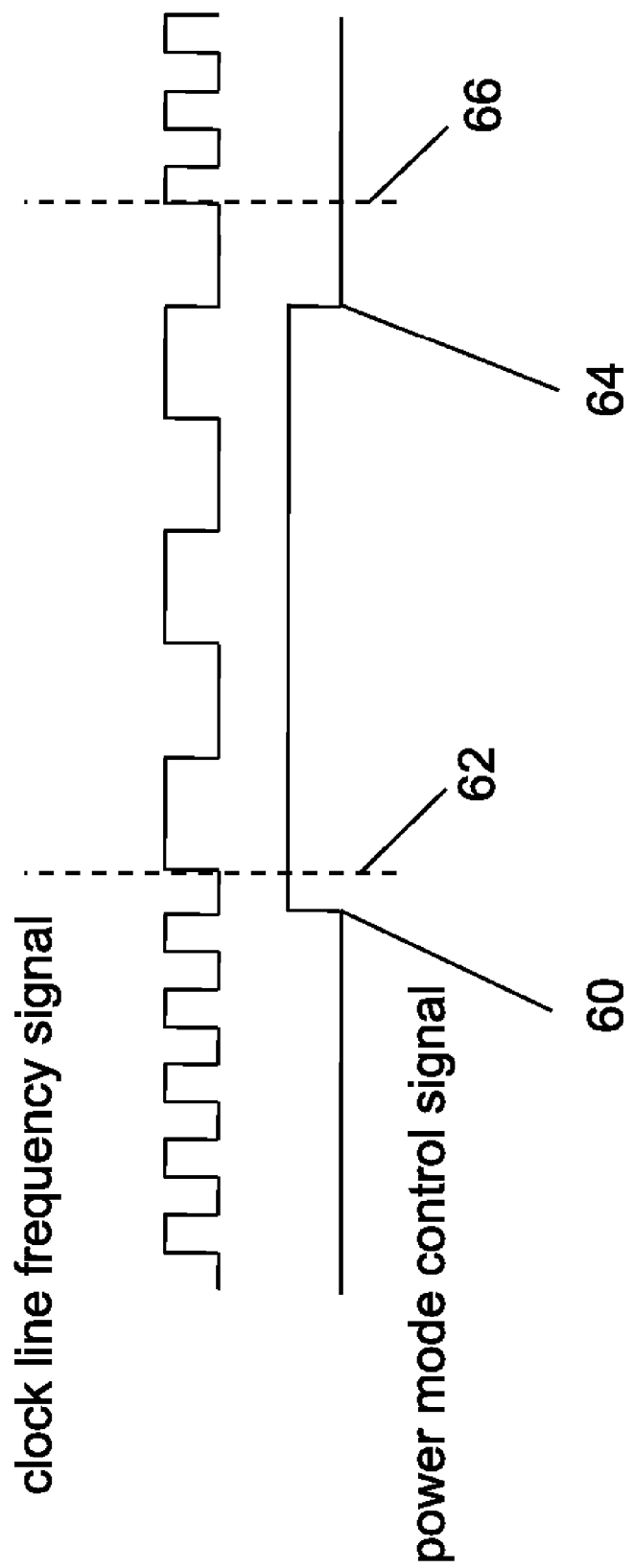
FIG. 3 is a schematic representation of a second operational mode of the system of FIG. 1, given by way of example.

Referring to FIG. 3, a second operational mode of the system 1 will be described. The figure again shows a schematic representation of a frequency signal provided to the secure RTC 3 on the clock line 23, and a schematic representation of a power mode control signal provided to the multiplexer 11 on the control line 25. The microprocessor 13 continuously determines the power mode in which the device and system 1 are operating, and generates a power mode control signal of appropriate state. Again, in this operational mode of the system 1, a power mode control signal having a state of 0 is generated by the microprocessor 13 when the system 1 and device are operating in the normal power mode, and a power mode control signal having a state of 1 is generated by the microprocessor 13 when the system 1 and device are operating in the low power mode. When the device and system 1 are operating in the normal power mode, i.e. the multiplexer 11 receives a power control signal having a state of 0, the multiplexer 11 acts to output a frequency signal to the clock line 23 which has the 'full' frequency, i.e. 32.768 kHz.

The secure RTC 3 will operate at this frequency. When the microprocessor 13 detects a change in the device and system operating power mode, from the normal power mode to the low power mode, the microprocessor 13 generates a power control signal of state 1 on the falling edge of a pulse of the frequency signal of the clock line 23 (illustrated at reference 60 of FIG. 3). The change in power control signal state is achieved by the microprocessor 13 by releasing a low power pin which is normally held low. The power control signal of state 1 is received by the multiplexer 11, and at the end of a complete 32.768 kHz cycle of the clock line signal (illustrated at reference 62), the multiplexer 11 acts to output a frequency signal to the clock line 23 which has a 'reduced' frequency, i.e. 32.768 kHz divided by $2^n$, where n may be, for example, 5. The secure RTC 3 will change to operate at this frequency, and the microprocessor 13 will compensate for the reduced frequency operation of the secure RTC. In this operational embodiment, the PMIC 15 of the device monitors the duration of the reduced frequency clock line signal and generates a power control signal of state 0 after a pre-programmed duration, or the PMIC generates a power control signal of state 0 upon receiving a wake-up event with synchronisation (illustrated at reference 64 of FIG. 3). The change in power control signal state is achieved by the PMIC 15 by pulling the low power pin low. The power control signal of state 0 is received by the multiplexer 11, and at the end of a complete reduced frequency cycle of the clock line signal (illustrated at reference 64), the multiplexer 11 acts to output a frequency signal to the clock line 23 which has the full frequency, i.e. 32.768 kHz. The secure RTC 3 will change back to operation at this frequency.

Figure 4:
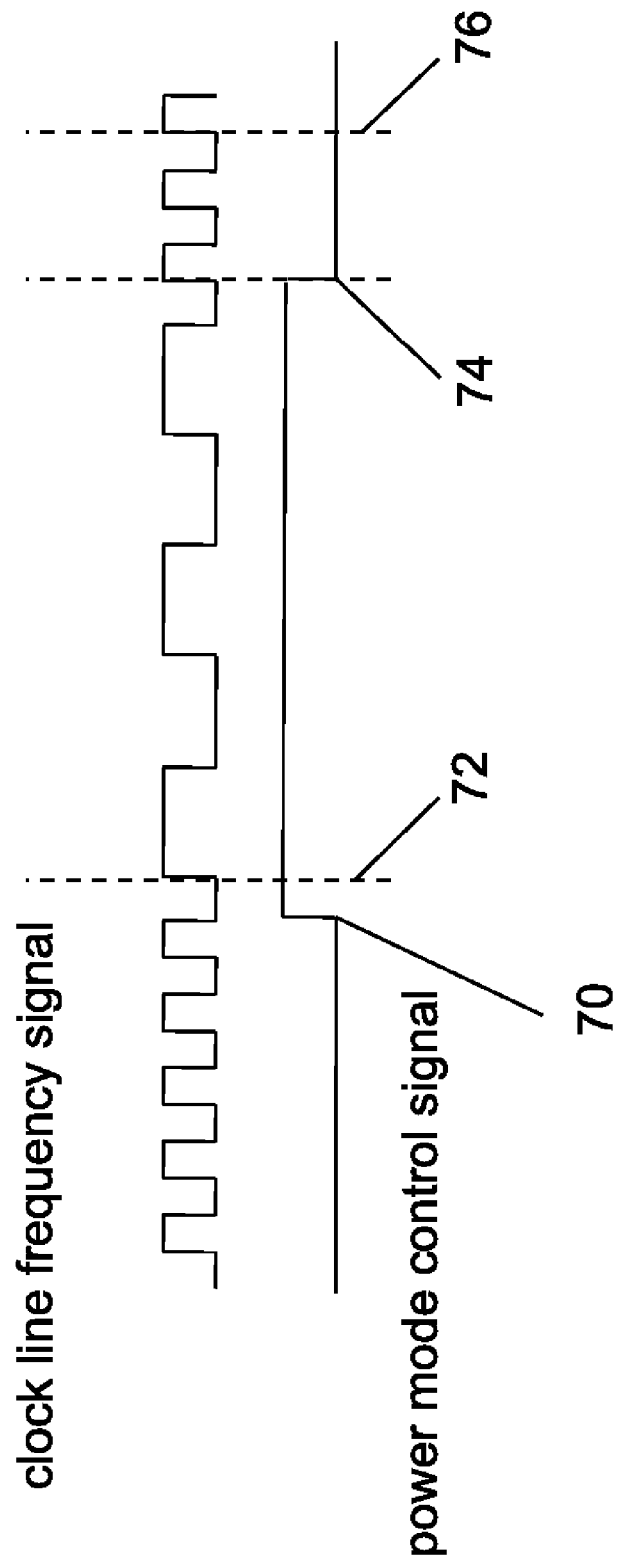
FIG. 4 is a schematic representation of a third operational mode of the system of FIG. 1, given by way of example.

Referring to FIG. 4, a third operational mode of the system 1 will be described. The figure again shows a schematic representation of a frequency signal provided to the secure RTC 3 on the clock line 23, and a schematic representation of a power mode control signal provided to the multiplexer 11 on the control line 25. The microprocessor 13 continuously determines the power mode in which the device and system 1 are operating, and generates a power mode control signal of appropriate state. Again, in this operational mode of the system 1, a power mode control signal having a state of 0 is generated by the microprocessor 13 when the system 1 and device are operating in the normal power mode, and a power mode control signal having a state of 1 is generated by the microprocessor 13 when the system 1 and device are operating in the low power mode. When the device and system 1 are operating in the normal power mode, i.e. the multiplexer 11 receives a power control signal having a state of 0, the multiplexer 11 acts to output a frequency signal to the clock line 23 which has the 'full' frequency, i.e. 32.768 kHz. The secure RTC 3 will operate at this frequency. When the microprocessor 13 detects a change in the device and system operating power mode, from the normal power mode to the low power mode, the microprocessor 13 generates a power control signal of state 1 on the falling edge of a pulse of the frequency signal of the clock line 23 (illustrated at reference 70 of FIG. 4). The change in power control signal state is achieved by the microprocessor 13 by releasing a low power pin which is normally held low. The power control signal of state 1 is received by the multiplexer 11, and at the end of a complete 32.768 kHz cycle of the clock line signal (illustrated at reference 72), the multiplexer 11 acts to output a frequency signal to the clock line 23 which has a 'reduced' frequency, i.e. 32.768 kHz divided by $2^n$, where n may be, for example, 5. The secure RTC 3 will change to operate at this frequency, and the microprocessor 13 will compensate for the reduced frequency operation of the secure RTC. In this operational embodiment, the PMIC 15 of the device again monitors the duration of the reduced frequency clock line signal and generates a power control signal of state 0 after a pre-programmed duration, or the PMIC 15 generates a power control signal of state 0 upon receiving a wake-up event with synchronisation (illustrated at reference 74 of FIG. 4). The change in power control signal state is achieved by the PMIC 15 by pulling the low power pin low. The power control signal of state 0 is received by the multiplexer 11, and this immediately acts to output a frequency signal to the clock line 23 which has the full frequency, i.e. 32.768 kHz (illustrated at reference 74). The secure RTC 3 will change back to operation at this frequency. In this embodiment, the multiplexer does not wait until an end of a complete reduced frequency cycle of the clock line signal, before switching to the full frequency signal. The PMIC 15 monitors the reduced frequency signal, and detects if a complete number of cycles of this signal are output to the clock line. If this is not the case, the PMIC 15 determines the number of reduced frequency pulses in the 'missing' part of the last reduced frequency cycle, and uses this to calculate the equivalent number of full frequency pulses. The microprocessor 13 reads the number of full frequency pulses from the PMIC 15, and causes the multiplexer 11 to output this number of full frequency pulses, before commencing output of the full frequency signal proper (illustrated at reference 76). Thus a reduced frequency signal comprising one or more full cycles is output by the multiplexer 11 to the clock line 23.

The invention claimed is:

1. A secure real time clock (RTC) system comprising:
   a secure RTC;
   a frequency adjuster connected between the secure RTC and the frequency signal generator, for receiving a signal having a first frequency from the frequency signal generator, and on receipt of a first control signal outputting the signal having the first frequency to the secure RTC, and on receipt of a second control signal adjusting the signal having the first frequency to generate a signal having a second frequency, the second frequency being lower than the first frequency, the first and second control signals indicative of a power mode of the system,
   wherein the frequency adjuster comprising:
      a frequency divider and
      a multiplexer for respectively receiving the first and second control signals, and respectively causing output of either the signal having the first frequency in response to receiving the first control signal or the signal having the second frequency in response to receiving the second control signal.

2. The system as claimed in claim 1 wherein the frequency divider is arranged for adjusting the signal having the first frequency to generate the signal having the second frequency by frequency dividing the signal having the first frequency.

3. The system as claimed in claim 2 wherein the frequency divider frequency is arranged to divide the signal having the first frequency by 2n.

4. The system as claimed in claim 1, wherein the multiplexer receives the first control signal in response to the system operating in a normal power mode.

5. The system as claimed in claim 4 wherein the multiplexer receives the second control signal in response to the system operating in a low power mode.

6. The system as claimed in claim 1 further comprising a clock line for transmitting the signal having the first frequency and the signal having the second frequency from the frequency adjuster to the secure RTC, the clock line having a first power consumption when transmitting the signal having the first frequency and having a second power consumption when transmitting the signal having the second frequency, the first power consumption being greater than the second power consumption.

7. The system as claimed in claim 1 wherein when the frequency adjuster outputs the signal having the first frequency to the secure RTC, the RTC operates with a first accuracy, and when the frequency adjuster outputs the signal having the second frequency to the secure RTC, the RTC operates with a second accuracy, the first and second accuracies being substantially the same.

8. The system as claimed in claim 1 wherein the frequency generator is implemented on a power management integrated circuit of the system.

9. The system as claimed in claim 1 wherein the frequency adjustor is implemented on a power management integrated circuit of the system.

10. The system as claimed in claim 1 wherein the secure RTC is implemented on a microprocessor of the system.

11. The system as claimed in claim 2 wherein the multiplexer receives the first control signal when the system is operating in a normal power mode.

12. The system as claimed in claim 3 wherein the multiplexer receives the first control signal when the system is operating in a normal power mode.

13. The system as claimed in claim 2 wherein the multiplexer receives the second control signal when the system is operating in a low power mode.

14. The system as claimed in claim 3 wherein the multiplexer receives the second control signal when the system is operating in a low power mode.

15. The system as claimed in claim 4 wherein the multiplexer receives the second control signal when the system is operating in a low power mode.

16. The system as claimed in claim 2 further comprising a clock line for transmitting the signal having the first frequency and the signal having the second frequency from the frequency adjustor to the secure RTC, the clock line having a first power consumption when transmitting the signal having the second frequency, the first power consumption being greater than the second power consumption.

17. The system as claimed in claim 3 further comprising a clock line for transmitting the signal having the first frequency and the signal having the second frequency from the frequency adjuster to the secure RTC, the clock line having a first power consumption when transmitting the signal having the first frequency, and having a second power consumption when transmitting the signal having the second frequency, the first power consumption being greater than the second power consumption.

18. The system as claimed in claim 4 further comprising a clock line for transmitting the signal having the first frequency and the signal having the second frequency from the frequency adjuster to the secure RTC, the clock line having a first power consumption when transmitting the signal having the first frequency and having a second power consumption when transmitting the signal having the second frequency, the first power consumption being greater than the second power consumption.

19. The system as claimed in claim 5 further comprising a clock line for transmitting the signal having the first frequency and the signal having the second frequency from the frequency adjuster to the secure RTC, the clock line having a first power consumption when transmitting the signal having the first frequency and having a second power consumption when transmitting the signal having the second frequency, the first power consumption being greater than the second power consumption.

20. A method of operating a secure real time clock(RTC) system, the method comprising:
   supplying a secure RTC of the system with a signal having a first frequency in response to the system operating in a first power mode;
   supplying the secure RTC with a signal having a second frequency instead of supplying the signal having the first frequency in response to the system operating in a second, lower, power mode, the second frequency being lower than the first frequency.

\* \* \* \* \*

UNITED STATES PATENT AND TRADEMARK OFFICE
CERTIFICATE OF CORRECTION

PATENT NO. : 8,341,443 B2  
APPLICATION NO. : 12/599126  
DATED : December 25, 2012  
INVENTOR(S) : Cor Voorwinden et al.

Page 1 of 1

It is certified that error appears in the above-identified patent and that said Letters Patent is hereby corrected as shown below:

In the Claims

In Column 8, Line 28, please change "A method" to -- The method --.

Signed and Sealed this
Fourth Day of June, 2013

Teresa Stanek Rea
*Acting Director of the United States Patent and Trademark Office*